United States Patent [19]

Saunders, IV

[11] 4,166,650
[45] Sep. 4, 1979

[54] BREAKAWAY HANDLEBAR-MOUNTED MOTORCYCLE FAIRING

[76] Inventor: Charles A. Saunders, IV, P.O. Box 1246, Columbus, Nebr. 68601

[21] Appl. No.: 829,638

[22] Filed: Sep. 1, 1977

[51] Int. Cl.² .................................................. B62J 17/04
[52] U.S. Cl. .................................. 296/78.1; 280/289 S
[58] Field of Search .............. 296/84 R, 84 A, 78.1; 180/84; 280/152.1, 155.5 A, 289 S

[56] References Cited

U.S. PATENT DOCUMENTS

| 2,675,266 | 4/1954 | Cemiskey, Sr. | 296/78.1 |
| 3,369,836 | 2/1968 | Haycock et al. | 296/78.1 |
| 4,022,487 | 5/1977 | Leahy | 296/78.1 |

Primary Examiner—Richard A. Bertsch
Attorney, Agent, or Firm—Edwin L. Spangler, Jr.

[57] ABSTRACT

This invention relates to a breakaway handlebar-mounted motorcycle fairing characterized by a generally pear-shaped concavo/convex plastic windscreen having inturned integrally-formed ears on both side margins and a cutout along its lower edge which receive the impact-responsive quick-disconnect couplings of the upper and lower mounting hardware. The upper mountings have their rear ends detachably connected into the hollow ends of the handlebars while their front ends terminate in ball-and-socket type quick-disconnect couplings at the ears. The upper mountings adjust angularly, lengthwise and accommodate different tilts of the windscreen. The lower mounting fastens to the sides of the cutout in the lower edge of the windscreen by means of a pair of adjustable connectors which support a transverse rod therebetween that is, in turn, detachably connected within a keyway-shaped slot in the front face of a banded connector fastened to the shock absorber or fork of the motorcycle.

12 Claims, 13 Drawing Figures

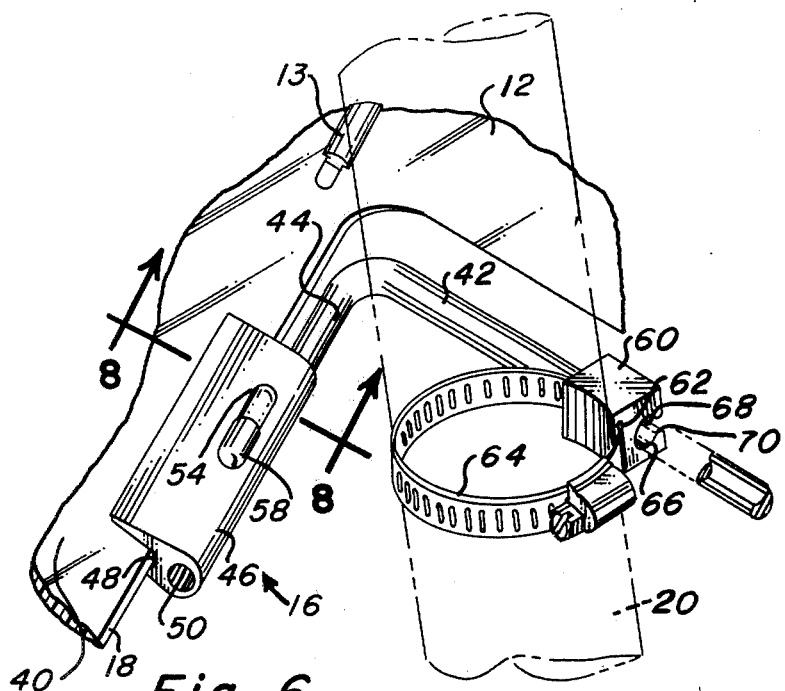
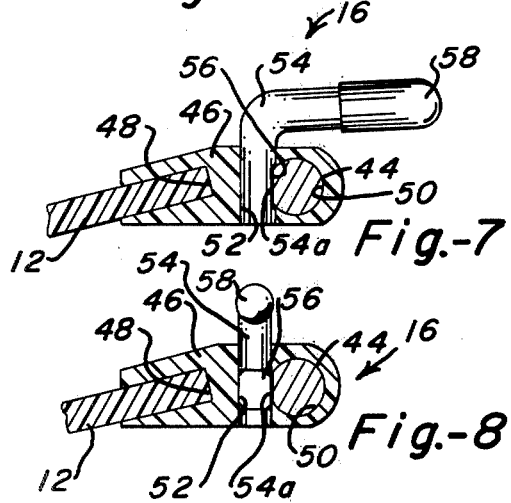
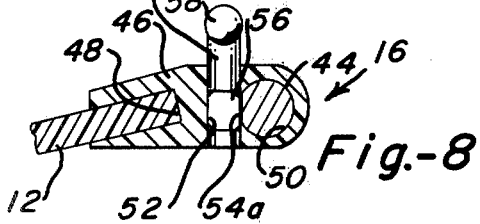

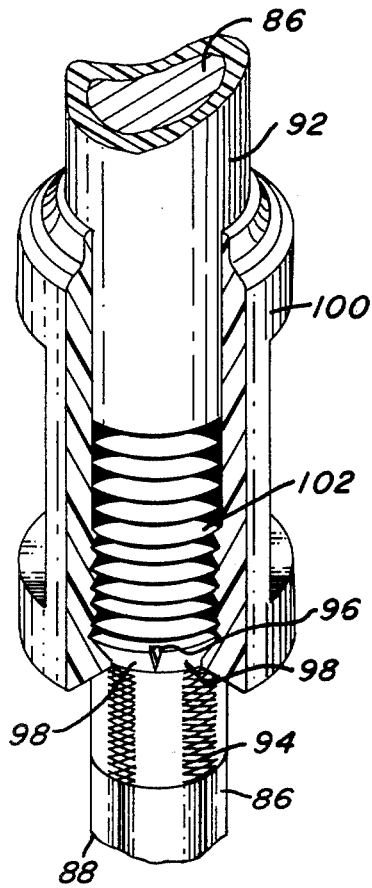
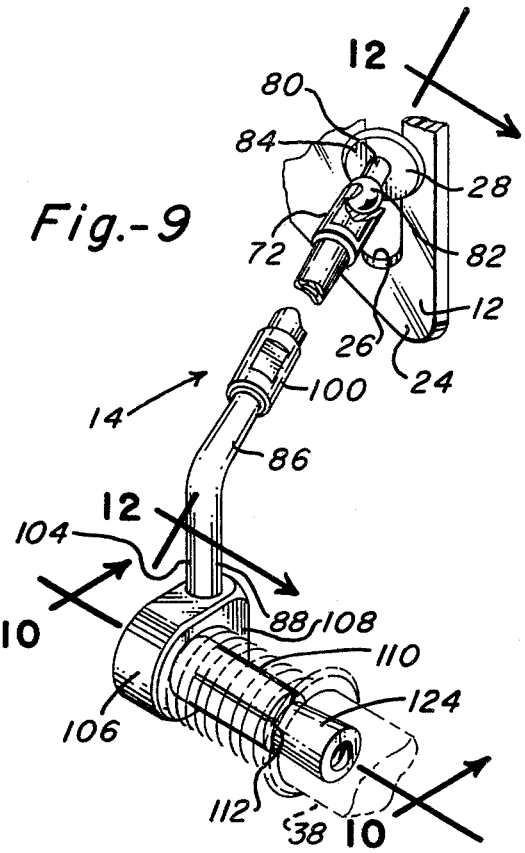
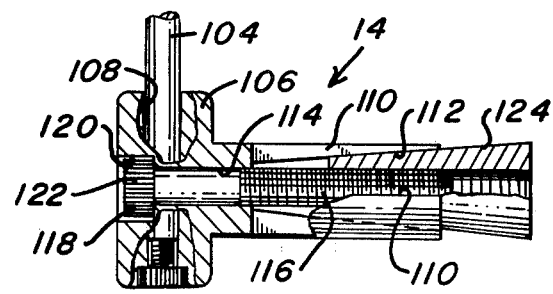
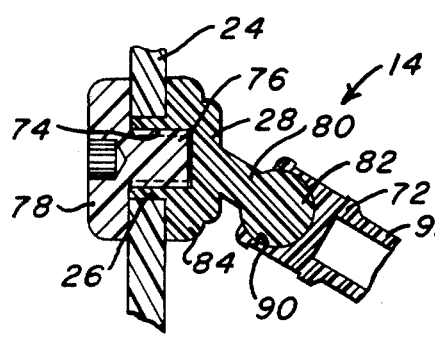
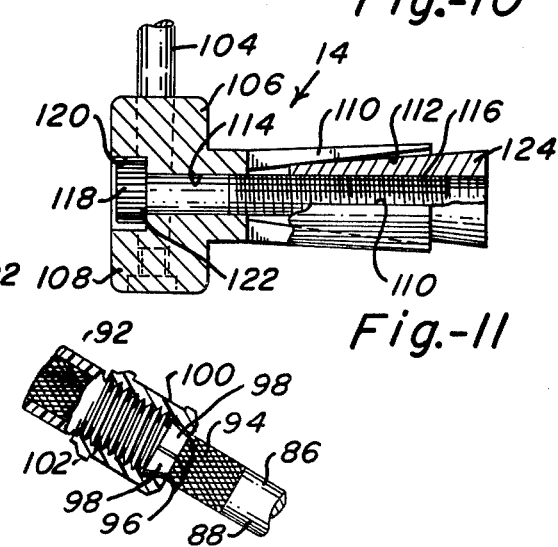

BREAKAWAY HANDLEBAR-MOUNTED MOTORCYCLE FAIRING

Windscreens or so-called "fairings" constitute widely used and well-known accessories with which most motorcycles and even some bicycles are equipped. These units become especially necessary when one travels at fast speeds on the open highway because the airstream hitting the cyclist in the face and body becomes a potent physical force with which to contend.

While there are a great many styles and shapes, some of which even perform the added function of directing an airstream across the engine for cooling purposes, there are only two basically different types, one the frame-mounted and the other a handlebar-mounted version that turns from side to side in conjunction with the steerable front wheel. Of the two types, the general preference seems to run in favor of the frame-mounted type because, up until now at least, most cyclists consider that it is safer, leaves the "bike" easier to handle, is less drafty and, most important, has little adverse effect upon the stability of the vehicle at high speeds. Conversly, the available handlebar-mounted fairings are, for the most part, considered quite dangerous to use because any turbulence created thereby is transmitted directly to the steering mechanism thus adversely effecting the handling characteristics of the motorcycle. In fact, some such fairings are so poorly designed and constructed that they may be at least partly responsible for making the motorcycle difficult to control, especially in the presence of severe crosswinds.

Unfortunately, this is but one of several safety hazards shared by many of the motorcycle fairings in use at the present time. Many of these others shortcomings are shared by both the frame and handlebar-mounted types. For instance, the attempts at streamlining often result in bizarre distortions of objects viewed through the waves, curves, varying thicknesses and other imperfections in the transparent surfaces. In others, the fairing itself becomes a lethal instrument fully capable of inflicting serious injury or even death upon the rider in case of an accident. Some are even so thin and fragile that they vibrate and flutter in the wind to say nothing of undergoing gross changes in shape that have a deleterious effect upon their streamlining characteristics which, presumably at least, they had to start with.

The windscreens themselves constitute a source of danger for the rider should he or she be thrown forwardly against the latter upon impact with some other vehicle or object. The prior art is replete with foldable, tiltable and even detachable fairings as exemplified by the following U.S. Pat. Nos.:

1,360,945; 1,387,349; 2,564,800; 3,829,152; 3,369,836.

No one, however, so far as applicant is aware has made a true breakaway fairing in which an impact of the rider's body against the rear face thereof is effective to remove same completely from the vehicle all without serious injury to the occupant while, at the same time, keeping the unit securely fastened to the vehicle so as to withstand the airstream pressing against the front face thereof along with objects thrown thereagainst.

A better handlebar-mounted breakaway fairing should, if at all possible, detach itself from the vehicle upon being impacted by a blow from behind of a magnitude less than that which will inflict any serious injury upon the rider, while, at the same time, resisting frontal blows from airborne objects that strike it with considerable force, all without breaking, shattering or being punctured. Clarity and lack of distortion, especially when stressed are fundamental requirements as is the ability to remain free of scratches, pockmarks and other surface abrasions in the presence of blowing dust, sand and rocks kicked up by other vehicles. There remains, of course, the necessity for being able to quickly and easily adapt the fairing to all manner of different motorcycle designs as well as rider sizes without having to tailormake fittings for each one. Paramount among the requirements for a good handlebar-mounted fairing is the streamlining which permits it to withstand relative wind speeds, even crosswinds, well in excess of 100 mph without vibrating, distorting to any significant degree, flying off or creating any unstable condition that has an adverse effect upon the rider's ability to maintain full and positive control over the movements of the vehicle. In fact, the ideal fairing would, in and of itself, exert a stabilizing influence on the bike due to its directing the slipstream around the rider and other projecting surfaces that would otherwise evoke a turbulent condition.

It has now been found in accordance with the teaching of the instant invention that these and other attributes of the ideal handlebar-mounted fairing can, in fact, be achieved by the simple, yet unobvious, expedient of engineering the shape, curvature and mounting hardware so as to virtually eliminate turbulent air flow while, at the same time, providing a clear, distortion-free windscreen capable of protecting the rider against flying objects yet breaking free of the motorcycle upon minimal impact from the rear. The position of the mounting hardware and its method of attachment is such that vibration, flutter and distortion are virtually eliminated, in fact, the rigidity of the fairing increases with an increase in wind pressure thereagainst. The fairing itself is smooth surfaced throughout and its gently curved and rounded marginal edges tend to eliminate any injury occasioned by body contact therewith. Mounting is simple, yet versatile and essentially universal, in that the fairing adapts readily to most modern motorcycles while accommodating different size riders and riding styles.

Accordingly, it is the principal object of the present invention to provide a novel and improved motorcycle fairing.

A second objective is the provision of a device of the class described which is handlebar mounted, yet, provides the safety and stability heretofore unachieved by such units.

Another object is to provide a breakaway fairing which will resist heavy frontal blows without coming loose, breaking or shattering but will tear loose from the bike upon minimal impact from behind.

Still another objective of the invention herein disclosed and claimed is the provision of a windscreen for motorcycles and the like that is so designed and mounted that vibration, edge flutter and overall distortion are virtually eliminated and, as a matter of fact, it increases in rigidity as the wind force thereagainst gets greater.

An additional object is to provide a cycle fairing which is readily adjustable to fit various types and makes of motorcycles as well as accommodating different size riders and riding styles, all with essentially the same simple mounting hardware.

Further objects of the within described invention are to provide a motorcycle fairing that is compact, rugged, lightweight, distortion free even under load, versatile, highly transparent, resistant to abrasion and extremely decorative.

Other objects will be in part apparent and in part pointed out specifically hereinafter in connection with the description of the drawings that follows, and in which:

FIG. 6 is a fragmentary perspective view showing the lower mounting in detail and to a greatly enlarged scale approximating that of FIG. 5, the motorcycle shock absorber having been shown in phantom lines while portions of the rod have been broken away to more clearly reveal the quick-disconnect coupling;

FIG. 7 is a fragmentary section similar to FIG. 8 except that it shows the latch in released as opposed to locked position;

FIG. 8 is a fragmentary section taken along line 8—8 of FIG. 6;

FIG. 9 is a fragmentary perspective view, portions of which have been broken away and shown in section, revealing the upper mounting to approximately the same scale as FIG. 6, portions of the handlebar having been shown in phantom line while portions of the ball-and-socket quick-disconnect coupling have been broken away;

FIG. 10 is a fragmentary view taken along line 10—10 of FIG. 9 showing the details of the expandable plug connector partly in section and partly in elevation;

FIG. 11 is a view very similar to FIG. 10 except that the plug is shown in expanded condition;

FIG. 12 is a fragmentary section to an even further enlarged scale taken along line 12—12 of FIG. 9; and, FIG. 13 is a still further enlarged fragmentary detail portions of which have been broken away and shown in section revealing the coupling employed to hold the telescoped strut sections in adjusted position.

Figures 1, 2, 3, 4, 5:
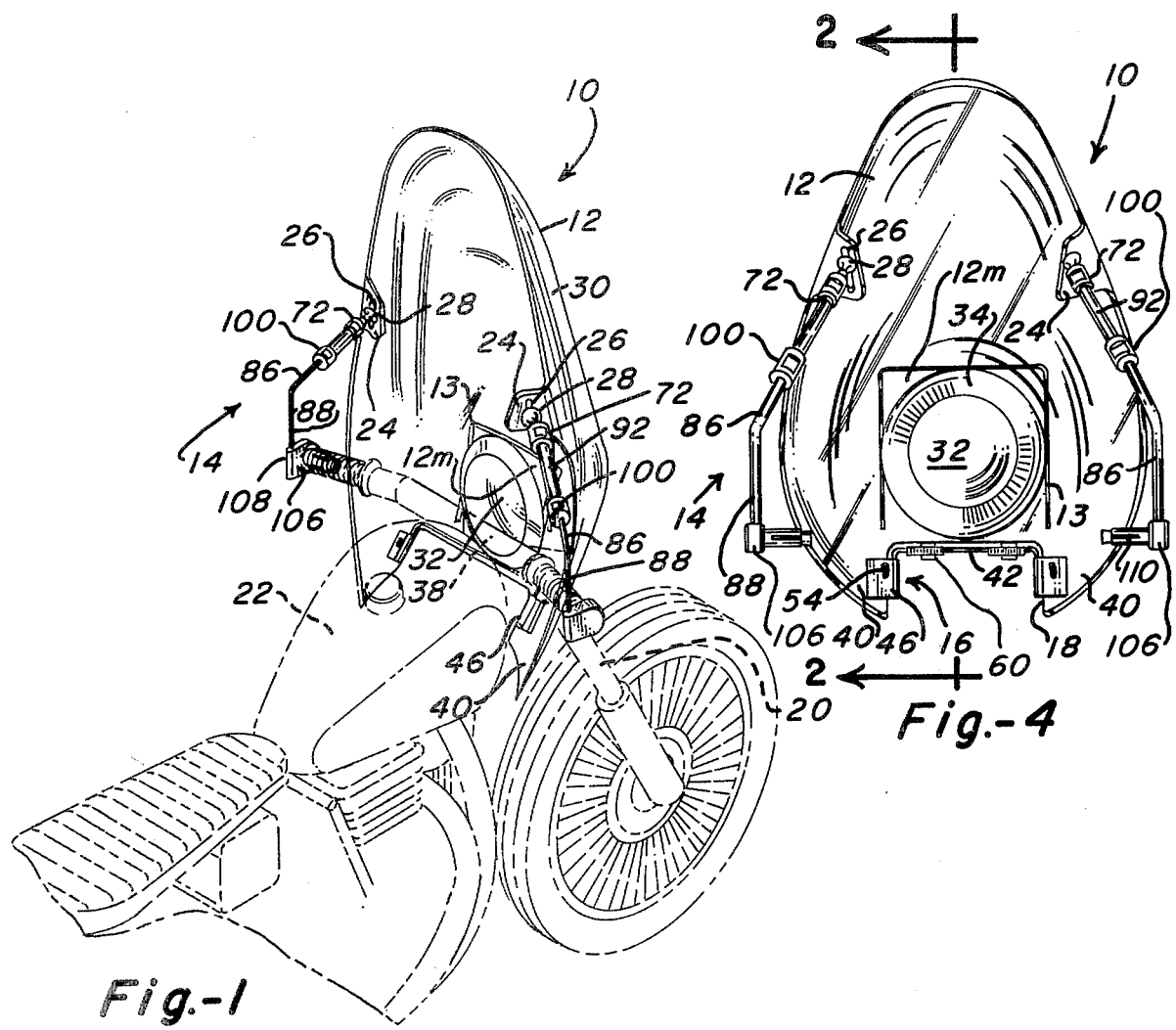
FIG. 1 is a perspective view showing the fairing mounted in place upon the handlebars of a motorcycle, the latter having been shown in phantom lines.
FIG. 2 is a vertical half section taken along line 2—2 of FIG. 4 and showing the windscreen and associated mounting hardware in relation to the motorcycle headlight.
FIG. 3 is a horizontal section taken along line 3—3 of FIG. 2.
FIG. 4 is a rear elevation showing the same things as FIGS. 2 and 3.
FIG. 5 is a fragmentary section similar to FIG. 3 but to a greatly enlarged scale showing the details of the boot and light trap associated with the windscreen and headlight.

Referring next to the drawings for a detailed description of the present invention and, initially, to FIGS. 1, 2 and 4 for this purpose, reference numeral 10 has been selected to broadly designate the entire assembly which includes the fairing 12 and the mounting hardware therefor, the latter having been broken down into the upper breakaway mounting generally indicated by numeral 14 and the lower breakaway mounting similarly referenced by numeral 16. The fairing itself, 12, comprises a one piece molded plastic member formed from a sheet of clear transparent acrylic or polycarbonate. It has a generally pear-shaped edge conformation except for a cutout 18 in the bottom edge thereof through which the fork 20 of the motorcycle 22 passes. The side margins each include an integrally-formed tab 24 vertically slotted as at 26 to adjustably receive the ball fitting 28 of a ball-and-socket coupling that forms a part of upper breakaway mounting 14 and which will be described in detail presently. These tabs turn inwardly behind the convex streamlined surface 30 that faces forwardly and moves through the air without creating turbulence as it flows thereover.

Surface 30 is a complex one starting with a generally-spherical bulge or protuberance 32 located midway between the side margins and approximately two-thirds of the way down from the top. This bulge is fitted on the inside concave surface thereof with an elastic ring or boot 34 which encircles the headlight 36 and forms a weathertight seal between it and the fairing. Bulge 32 constitutes the forwardmost surface of the fairing and all the remaining surfaces slope rearwardly away therefrom. The elements of surface 30 radiating from the margins of bulge 32 are essentially straight lines starting at the top thereof and extending down on both sides some 45° or so. At this point, the elements begin to curve with the greatest radius of curvature being adjacent bulge 32 and becoming less curved as they approach the margins which are nearly straight lines again. These progressive curves from the margins inward become more pronounced as one moves down the sides with the greatest curvature being at the bottom center. The resultant smoothly curved and unobstructed surface is sufficiently streamlined to permit the airstream to impact same and flow therearound without any noticeable turbulence. In fact, road tests of the fairing mounted on a stock motorcycle at speeds well in excess of 100 mph produced no significant turbulence, vibration or edge flutter and the unit remained extremely stable and fully controllable. Even crosswinds of considerable velocity had little effect upon the stability or the like even at high road speeds.

Many, if not most, fork-mounted fairings have flap-like portions extending out to the sides which at high speeds have a pronounced tendency to vibrate and flutter. The instant fairing, on the other hand, almost completely eliminates this problem by fastening it securely to the handlebars 38 by the inturned ears 24 on the side margins thereof. The resultant structure tends to become more rigid as the airstream pressing thereagainst increases in velocity because the fairing tends to flatten out spreading ears 24 farther apart while upper mountings 14 resist this spreading action. The same thing is true of lower mountings 16 which grip the fairing at the sides of cutout 18 and thus stabilize the flap-like portions 40 alongside thereof.

Next, looking at FIGS. 2–5, inclusive, it will be seen that the headlight 36 lies spaced a short distance behind the bulge 32 and in substantial horizontal alignment therewith, the gap therebetween being bridged by boot or collar 34. This collar is made of an elastomeric material capable of stretching to accommodate various sizes and shapes of headlights while engaging the surface thereof frictionally. In so doing, it is unnecessary to have the boot fasten to the inside of the fairing.

The beam from some headlights may be such as to cause a fiber optic effect in the fairing which results in a ribbon of light being seen by the rider along the edge thereof. If such should be a problem, it is easily solved by providing the fairing with an opaque gasket 13 made of an elastomeric material detachably mounted in a slot 15 bordering the bulge 12M along the top and on both sides.

Next, particular reference will be made to FIGS. 1–4, 6, 7 and 8 for a detailed description of the lower breakaway mounting 16. A metal rod is bent to provide a transversely extending crossbar 42 terminating at both ends in downwardly and rearwardly extending end portions 44 which parallel the sides of cutout 18. Detachably fastened to each of these end portions 44 is a molded plastic connector 46. This connector has a slot 48 on its outside edge sized to grip the portion of the fairing 12 bordering the opening 18 in the bottom edge thereof. Located between the inside edge of the connector 46 and slot 48 is an opening 50 generally paralleling the latter and sized to slidably receive the adjacent end portion 44 of the rod. A lock pin-receiving opening 52 intersects opening 50 on one side thereof and mounts L-shaped lock pin 54 for rotational movement. At the point where opening 52 intersects opening 50, lock pin 54 is grooved as shown in FIGS. 7 and 8 at 56 to receive the end portion 44 when in the released or unlocked position of FIG. 7 thus permitting slidable adjustment of the connector 46 therealong. Alternatively, when lock pin 54 is rotated by means of handle 58 to a position such as that shown in FIG. 8 where groove 56 is no longer aligned within the intersection to receive end portion 44, then such pin functions to cam said end portion tightly against the inside wall of opening 50 thus locking the connector in fixed position on the rod. Not only does connector 46 provide means for adjusting the lower edge of the fairing forward and back to fit the needs and wishes of a particular rider, it also constitutes a quick-disconnect coupling that enables the user to demount the fairing when it is not wanted such as, for example, at low speed driving in city traffic.

Now, the transversely-extending portion 42 of the rod carries a pair of snap-release couplings 60 thereon that constitute the breakaway feature detachably mounting the lower edge of the fairing onto the fork or front shock absorbers 20 or the like, all of which is most clearly revealed in FIG. 6 to which detailed reference will now be made. Couplings 60 each are slit transversely as shown at 62 to receive the spring metal band 64 of conventional hose clamp 66 that fastens onto and around shock absorber 20 shown in phantom lines. This clamp more or less permanently fastens the couplings 62 to the motorcycle frame once they are tightened in place. They do, of course, accommodate different size shock absorbers and, in addition, provide the means for raising and lowering the fairing to suit the needs of a particular rider as well as adapting the fairing to various types, styles and sizes of motorcycles.

The breakaway feature is a simple one, namely, that of providing the front edge of each coupling with a keyway-shaped slot 66, the cylindrical portion 68 of which is sized to fit closely around the center section 42 of the rod while the neck 68 is somewhat narrower. These couplings 60 are molded from a plastic material capable of deforming to the extent necessary to release rod 42 from within the keyslot upon a forwardly-directed impact against the inside or rear face of the fairing of a predetermined magnitude known to not result in any significant injury to the rider. At the same time, the blow necessary to disconnect the fairing from its mountings 14 and 16 is designed to be sufficient to prevent accidental removal thereof, all these aspects of the breakaway mountings being well within the skill of the ordinary designer.

It is, perhaps, worthy of note that in the event the fairing becomes detached from its mountings 14 and 16, all but the ball fitting 28 of the upper breakaway mounting 14 remains with the bike while, in the case of the lower one 16, only clamp 66 and connector 60 do so.

Even in the case of an intentional removal of the fairing, the easiest way of accomplishing this is to pop ball fitting 28 out of its mating socket fitting 72 and the center section 42 of the rod out of the keyslots 66 in connectors 60. Connectors 46 can, of course, be unlocked from the end portions 44 of the rod and slid off the end thereof thus leaving the rod in place within snap connectors 60 but this makes reassembly a much more difficult and precise operation because connectors 46 must be returned to their previous locations along the rod ends if the fairing is to be in the same place it formerly occupied.

Next, with reference to FIGS. 9-13, inclusive, the upper breakaway mountings 14 will be described in detail. As has already been mentioned, ball fitting 28 is adjusted within slot 26 in ear 24 more or less vertically to accommodate raising and lowering of the fairing. The front of ball fitting 28 is shown provided with an internally-threaded socket 74 (FIG. 12) into which the externally-threaded shank 76 of plastic bolt 78 screws. In the particular form shown, the neck 80 interconnecting the spherical portion 82 of ball fitting 28 with the base 84 thereof is inclined at an angle to the latter. This neck is arranged to slant downwardly and rearwardly at approximately the same tilt as the upper leg 86 of dogleg strut 88 which will be described presently.

Socket fitting 72 includes a socket 90 in the forward end thereof sized and shaped to expand to the extent required to receive ball 82 with a snap fit. This ball and socket connection comprises the upper breakaway mounting designed to release the fairing from the vehicle as the rider impacts the rear or inside face thereof with a force less than that sufficient to cause serious injury yet great enough to prevent accidental removal. As shown in FIG. 12, socket fitting 72 includes an integrally-formed sleeve 92 that fits loosely over the knurled section 94 on the forward extremity of dogleg strut 88, specifically, the upwardly and forwardly-extending leg 86 thereof. The end of sleeve 92 is slotted as shown at 96 to release fingers 98 which spring closed and grip the knurled section 94 of leg 86 when tapered nut 100 is screwed onto the externally-threaded section 102 of said sleeve. Such couplings are well known in the art and no novelty is predicated thereupon per se. The resultant adjustable telescopic connection does, however, provide the means for tilting the fairing forwardly or rearwardly as suits the wishes of the particular rider.

Finally, with detailed reference to FIGS. 9, 10 and 11, the couplings which are used to detachably connect the upper breakaway mountings 14 to the handlebars 38 will be described in detail. The rear, essentially vertical leg 104 of dogleg strut 88, is fastened within the body of female connector 106 by means of a morse-tapered connection indicated at 108 in FIG. 10. This connection is, of course, but one of many similar ways of fastening the rod and female connector together such that the rod may be swung from side to side in order to accommodate different width handlebars. Extending from one side of the body is a tubular extension containing an outwardly-flared frustoconical socket 112 therein. Female connector 108 may either be fabricated from a material sufficiently elastic and deformable to permit extension 100 to expand to the extent required to engage the inside wall of the handlebars 38 into which it is inserted as shown in FIG. 9 or, alternatively, this extension can be slit at intervals in the manner of sleeve 92 so that the fingers thus released will be free to expand more readily. Such details, once again, are well within the skill of the ordinary artisan and form no part of the present invention.

Communicating frustoconical socket 112 of the extension is a passage 114 through the body 106 adapted to receive the threaded shank 116 of bolt 118 and enable same to be freely rotated therein. An enlargement 120 defines a pocket which recesses the head 122 of the bolt. Passage 114 and frustoconical socket 112 are arranged coaxially in end-to-end relation.

Screwed onto the shank 116 of bolt 118 is a frustoconical plug or male element 124 which cooperates therewith upon rotation of the bolt to draw it into the frustoconical socket and expand the walls of the extension 110 into frictional engagement with the interior walls of the hollow handlebar. The female element can, of course, be rotated to vary the tilt of strut 88 while the latter can be turned from side to side. These adjustments along with the capability of telescoping the upper leg of the strut and accommodating a certain amount of misalignment due to the ball and socket connection provide an extremely versatile breakaway mount.

What is claimed is:

1. The motorcycle fairing which comprises: a generally pear-shaped concavo-convex clear transparent impact-resistant windscreen having a cutout along the bottom edge thereof sized and adapted to receive the steerable fork mounting the front wheel; a pair of strut means depending from the opposite side margins of the windscreen connectable to the motorcycle handlebars; means comprising a first quick-disconnect coupling carried by each of said strut means for detachably connecting same to one of said windscreen and handlebar members; bracket means carried by the windscreen alongside the cutout therein for attaching the latter to the steerable fork; and means comprising a second quick-disconnect coupling carried by the bracket means for detachable connecting same to one of said windscreen and fork members, said first and second quick-disconnect couplings being operative to uncouple and release the fairing from the motorcycle upon application of an impact blow of a predetermined magnitude to the rear face thereof.

2. The motorcycle fairing as set forth in claim 1 in which: the convex surface of the windscreen includes a generally spherical bulge positionable in front of the motorcycle headlight.

3. The motorcycle fairing as set forth in claim 1 in which: the windscreen includes a slot in that portion thereof covering the motorcycle headlight, said slot extending across the top of the latter and at least down along both sides thereof; and, in which an opaque insert is fitted into said slot effective to block the passage of light from said headlight to the side edges and top of the windscreen.

4. The motorcycle fairing as set forth in claim 1 in which: the first and second quick-disconnect couplings detachably connect the windscreen to the struts and bracket means respectively.

5. The motorcycle fairing as set forth in claim 1 in which: the cutout has transversely-spaced substantially parallel side margins; and the bracket means comprises a rod having a crossbar portion and downturned end portions positionable alongside the side margins of the cutout in spaced substantially parallel relation thereto, a first pair of connectors having slots therein sized to receive the side margins of the windscreen bordering the cutout therein carried by the downturned rod ends for adjustable movement therealong, and a second connector carried by the second quick-disconnect coupling connectable to the fork, said first pair of connectors and the rod defining a subassembly that remains attached to the windscreen upon decoupling of the latter from the fork at the second quick-disconnect coupling.

6. The motorcycle fairing as set forth in claim 1 in which: the side margins of the windscreen include integrally-formed inturned ears with apertures therein to receive the strut means, and wherein said ears and strut means cooperate with the latter mounted on the handlebars to resist spreading of the side margins of the windscreen upon application of a wind force thereagainst tending to flatten its convexity.

7. The motorcycle fairing as set forth in claim 1 in which: the first set of quick-disconnect couplings comprise ball-and-socket connectors releasably interconnecting the strut means and windscreen.

8. The motorcycle fairing as set forth in claim 1 in which: the bracket means includes a horizontally-disposed rod extending along the top of the cutout in the bottom edge of the windscreen; and in which the second quick-disconnect coupling comprises a slotted connector having a forwardly-opening keyway-shaped slot adapted to receive said rod with a snap-on releasable connection.

9. The motorcycle fairing as set forth in claim 1 in which: means comprising an expandable plug connector sized for insertion into the end of a tubular handlebar is carried by the strut means for connecting same to the motorcycle.

10. The motorcycle fairing which comprises: a generally pear-shaped concavo-convex clear transparent impact-resistant windscreen having the convex portion thereof positionable in front of the motorcycle headlight shaped to define a generally-spherical bulge and those elements of the concavo-convex surface radiating from the margins of said spherical bulge and contained in planes passing through the center thereof comprising essentially straight lines beginning at its apex and extending downwardly on both sides about 45°.

11. The fairing as set forth in claim 10 in which: the remaining elements of the windscreen are curved with the radius of curvature thereof becoming progressively greater from the margins of the windscreen inward toward the center thereof.

12. The fairing as set forth in claim 11 in which: the degree of curvature of said remaining elements becomes progressively greater as they approach the bottom thereof.

* * * * *